United States Patent

[11] 3,619,505

[72] Inventor Jacques K. Meile
Paris, France

[21] Appl. No. 56,432
[22] Filed July 20, 1970
[45] Patented Nov. 9, 1971
[73] Assignee Lignes Telegraphiques et Telephoniques
Paris, France
[32] Priority July 25, 1969
[33] France
[31] 6,925,411

[54] CLOCK PULSE DIGITAL SYNCHRONIZATION DEVICE FOR RECEIVING ISOCHRONOUS BINARY CODED SIGNALS
5 Claims, 4 Drawing Figs.

[52] U.S. Cl. .......... 178/69.5 R
[51] Int. Cl. .......... H04l 7/00, H04l 7/02
[50] Field of Search .......... 178/69.5 R; 325/325; 328/155; 307/208, 269

[56] References Cited

UNITED STATES PATENTS

| | | | |
|---|---|---|---|
| 3,376,385 | 4/1968 | Smith et al. .......... | 178/69.5 R |
| 3,549,804 | 12/1970 | Greenspan .......... | 178/69.5 R |

*Primary Examiner*—Robert L. Richardson
*Attorney*—Abraham A. Saffitz

ABSTRACT: A device for the synchronization of a clock pulse generator located in a receiving equipment for isochronous binary pulses, comprising means for deriving a brief control pulse from each transition in the received modulation, a local periodic pulse generator having a repetition rate equal to an integral multiple of the modulation speed, a synchronizing circuit receiving said periodic pulses and brief control pulses and delivering pulses to the input of a binary counter, said circuit having an extra input fed from the output stage of said counter, and electronic gate means controlling the transmission of said brief control pulses to said synchronization circuit and themselves controlled by the two last stages of said counter, whereby control of said clock pulse generator by untimely control pulses is prevented.

INVENTOR:
Jacques K. MEILE
By [signature]
ATTORNEY

INVENTOR:
Jacques K. MEILE
By [signature]
ATTORNEY

INVENTOR:
Jacques K. MEILE

By [signature]
ATTORNEY

CLOCK PULSE DIGITAL SYNCHRONIZATION DEVICE FOR RECEIVING ISOCHRONOUS BINARY CODED SIGNALS

This invention relates to digital synchronization (sync) devices used in the receiving equipment of data transmission systems, in which data are transmitted in the form of isochronous binary signals to put a local generator of cyclically repeated clock pulses under the control of the received modulation, with particular reference to such devices of the kind specified as use the transitions of such modulation to control the operation of such generator.

A clock pulse generator can be controlled by a distorted incident isochronous binary modulation by either analog or digital sync methods, digital methods usually being preferred in cases in which the generator is required to deliver pulses controlling functions at the same cadence as the modulation, for instance, the sampling of incident modulated signals, it being necessary for such sampling to occur at times near enough the middle of the duration of each of the unit time intervals of the received modulation for there to be no doubt about the significant binary state of the sampled elements.

One known digital sync method comprises comparing the times at which "reference pulses" transmitted by the generator appear with a predetermined instant of time in each of its operating cycles and to step the generator on or retard it by a predetermined fraction of the rated unit interval of such modulation according as the transition occurs before or after the reference pulse in the cycle.

Basically, a clock pulse generator, hereinafter abbreviated to "clock," using this sync method operates as follows:

A constant-frequency, e.g. crystal-stabilized, generator supplies pulses at a frequency $f$ equal to $k$ times the rated modulation speed F of the modulation transmitted at the sending end of the transmission channel, the factor $k$ being an integer which is usually chosen to be of the form $2^n$ or $2^n$-1; the pulses are transmitted via a complex logic circuit called the "synchronizer" to the input of a $n$—stage binary counter which, whenever it passes through the ($2^n$-1) counting state, transmits a reference pulse which goes to the synchronizer, the same also receiving control pulses produced by the transitions of the received modulation.

The synchronizer comprises means for detecting whether any control pulse occurs before or after the reference pulse in any clock cycle, and means for stepping-on or delaying the clock by a time interval of $1/f$ according as such control pulse occurred before or after the reference pulse.

In the absence of transition a clock cycle lasts for $k/f$—i.e. the rated or nominal unit interval of the received modulation; if a transition occurs before the reference pulse, the length of the clock cycle in which such pulse occurs is reduced to $(k-1)/f$; when a transition occurs after the reference pulse, the length of the cycle in which such transition occurs becomes $(k+1)/f$. Synchronism between the received modulation and the generator is achieved when the modulation transitions are distributed substantially equally on either side of the instants of time at which the reference pulses appear, such pulses then embodying the "reference times" for the received modulation transitions. At each return to zero a binary counter of the above-mentioned kind triggers the transmission of a sampling pulse which therefore occurs near the center of each of the modulation unit intervals.

Various embodiments are known for such generators, inter alia those described in W. Wild's article entitled "An Experimental Data Transmission System," published in the Swedish "Ericsson Review," 1962, volume 39, No. 3, pages 62 to 71, more particularly pages 65 and 66 with reference to FIG. 5; W. R. Bennet and J. R. Davey's work entitled "Data Transmission," published by McGraw Hill Book Company, New York, 1965, in the chapter "Methods of Synchronization," page 261 FIG. 14–1, and a study on a prior art facility in an article by R. Oeters and A. W. Maholock called "Synchronous Internal Clock," published in the American periodical "I.B.M. Technical Disclosure Bulletin," volume 10, No. 6, Nov. 1967, pages 716 and 717.

The only difference between the clocks described is in the internal construction of the synchronizer and in the value of the coefficient $k$ (which is 32 and 64 respectively in the first two examples mentioned) which determines the number of stages in the binary counter.

In all these constructions the time taken to achieve synchronism depends upon the shape of the modulation transmitted at the start of the transmission channel—i.e., upon the number of transitions occuring during a given number of transmitted unit intervals—upon the nature and level of distortions affecting the modulation received at the input of the receiving elements, and upon the phase shift of the first transition relatively to the reference time of the cycle in which the first transition appears, the worst case being the case in which the first transition occurs near the start time of a clock cycle, the clock then being out of phase with the received modulation by almost half a unit interval.

Hereinafter, T(0), T(1) .....$T(2^{n11})$, ....$T(2^n)$, will denote the instants of time in each cycle of the counter when the counter reaches the 0, 1, ..... $2^{n11}$ , ... $2^n$ state, the instant of time T(0) denoting the cycle origin time and the instant of time $T(2^{n11})$ denoting the reference time hereinbefore defined.

If the received modulation is undistorted, the time taken to achieve synchronism corresponds at most to the passage of $2^{n11}$modulation transitions—i.e., e.g. 16 transitions if $k$=32, for if the first transition occurred shortly after the clock cycle time T(0), the length of such cycle becomes $(k-1)/f$, so that the second transition occurs shortly after the time T(1) of a subsequent cycle, the third shortly after a time T(2) and so on, all the transitions stepping the generator on by $1/f$ until the transition of rank ($2^{n11}$+1) occurring shortly after a reference time $T(2^{n11})$ delays the generator by $1/f$. The subsequent transitions then occur near the reference times of subsequent cycles, occurring alternately before and after such reference times.

The presence of systematic and/or random distortion may delay the achievement of synchronism. For instance, if the first transition happened shortly after the time T(0), then if the second transition occurs with lead distortion greater than the lead distortion of the first transition, the second transition may occur before its proper time of occurrence T(0) in the clock cycle —i.e., just after the time $T(2^{n11})$ of the previous cycle—so as to produce a phase correction (delay of $1/f$) opposite to the phase correction produced by the first transition (lead of $1/f$). Consequently, a sequence of corrections which are alternately in opposite directions may occur, with the result that synchronism may be delayed or possibly even completely prevented.

A very disadvantageous case is the case in which the modulation suffers only from asymmetrical distortion and a first transition occurs shortly after a time T(0) with a positive individual distortion; in this case, the next transition, which appears with negative individual distortion, occurs before a time T(0) and produces a phase correction opposite to the phase correction produced by the first transition, whereafter all odd-rank transitions occur before a time T(0) and all even-rank transitions occur before a time T(0), so that the synchronization operation cannot start even if the levels of asymmetric distortion are relatively low; for instance, if the first transition occurs at a clock-cycle time separated from a time T(0) by a time interval less than the modulation unit interval fraction $1/k$, an asymmetrical distortion level of more than $1/k$, e.g., of 4 percent if $k$=32, will prevent the synchronization operation from starting, the clock therefore remaining substantially in phase opposition to the received modulation.

Consequently, there can be synchronism between the clock and the received modulation only if an adequate systematic or random distortion is imposed upon the asymmetrical distortion; a number of consecutive transitions of even and odd ranks may all be positioned either before or after the time $T(2^{n-1}$ of the cycles in which they occur and may cause consecutive phase corrections in the same sense, so that the transitions cease to occur in the critical zones near and on both sides of the times T(0).

Consequently, achieving synchronism between the clock and the received modulation may be a lengthy and even impossible business when anything like the events just described occurs.

It is an object of this invention to facilitate in the widest case and to make possible in some unfavorable cases synchronization between a clock of the kind hereinbefore described and a distorted incident isochronous modulation; according to the invention, therefore, a logic circuit controls the input into the clock of the control pulses produced by the modulation transitions, the logic circuit being distinguished by facilities to bar transmission to the clock of the control pulses occurring in the final quarter of any cycle if the previous control pulse has occurred in the first quarter of such cycle or of a previous cycle.

This invention provides a clock synchronization facility for the repetition of isochronous binary modulated signals, the facility comprising: means for deriving a brief control pulse from each modulation transition; a local generator of periodic pulses having a reception rate which is an integral multiple of the rated modulation speed; a synchronizing circuit receiving the periodic pulses at one input and at least some of the control pulses at a second input and delivering via an output stepping-on pulses to the input of a binary counter, the sync circuit having a third input connected to an output of the final stage of the counter; and means connecting the last-mentioned output to a load terminal, characterized in that it comprises electronic gate means receiving the control pulses at a first input and having an output connected to the first input of the sync circuit, the said gate means having a second input and a third input, the second input being connected to the output of the final stage of the counter, the third input being connected to an output of the penultimate stage of the counter a logic circuit being provided which makes the gate means conductive or nonconductive between their first input and their output in dependence upon the instantaneous binary state of the signals received at the outputs of the penultimate and final stages of the counter, and in dependence upon the binary state of a bistable circuit (flip-flop) controlled by the control pulses together with the last-mentioned signals.

The features of the device according to the invention will become apparent from the following description of a preferred embodiment and with reference to the explanatory exemplary nonlimitative drawings wherein.

Figure 1:
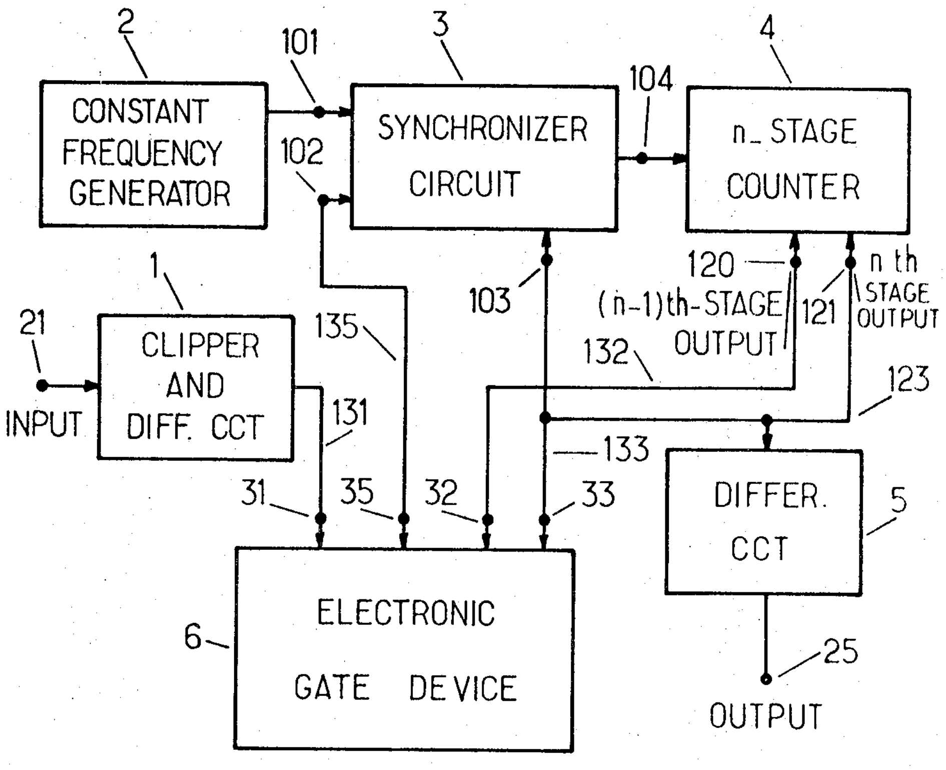
FIG. 1 is a block schematic diagram of a sync device according to the invention.
Figure 2:
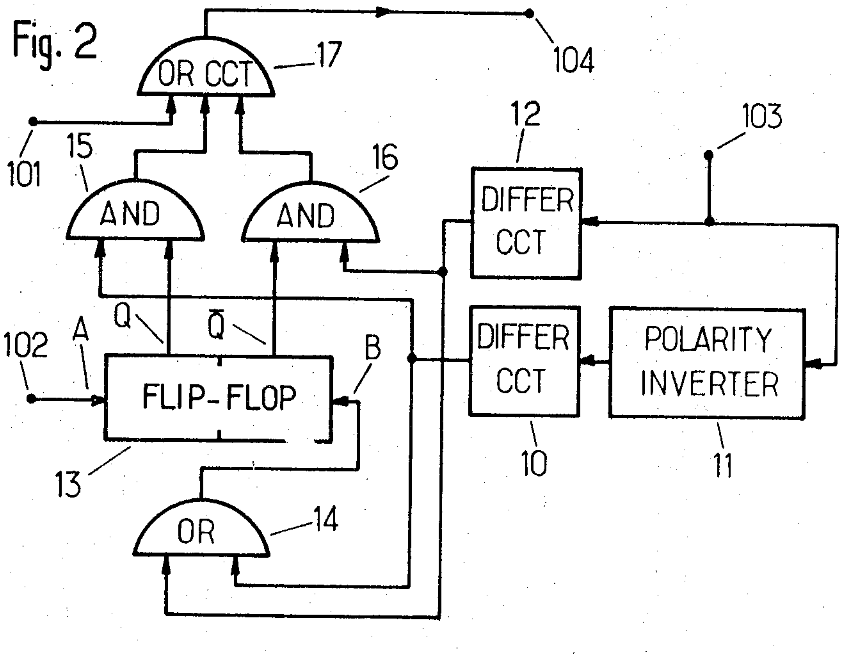
FIG. 2 shows the basic diagram for an element of FIG. 1, such element being prior art.
Figure 3:
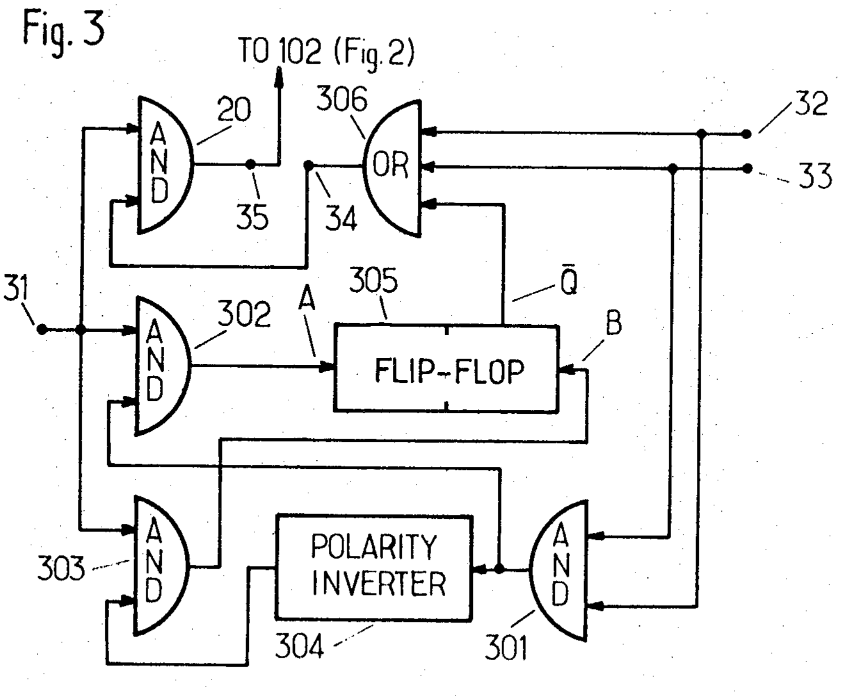
FIG. 3 shows an element of FIG. 1, such element forming an important and novel part of the invention, and FIG. 4 comprises a number of diagrams which will help in understanding the operation of the device according to the invention.

The following conventions are used in the explanations given hereinafter:

The Z-state and the U-state denote the two stable states, representing the binary values 0 and 1, which can be assumed by signals at various parts of the circuits shown in FIGS. 1, 2 and 3, the Z-state corresponding to a low potential and the U-state corresponding to a potential higher than the Z-state;

The control pulses produced by the transition corresponding to the changeover of such signals from the Z-state to the U-state are considered to be very brief positive pulses;

The logic AND- and OR-circuits and the bistables (flip-flops) operate on a positive logic basis;

The "cut-in" inputs of the flip-flops have the reference A and the "cut-out" inputs of the flip-flops have the reference B and their outputs have the references Q and $\overline{Q}$ respectively, any flip-flop being in its inoperative or rest position when its output Q is in the Z-state and its output $\overline{Q}$ is in the U-state and being in the operative position when its output Q is in the U-state and its output Q is in the Z-state.

The response time of the various flip-flops is short relatively to the recurrence period of the pulses of frequency $f$ delivered by the generator and is, for instance, less than 20 percent of the length $1/f$ of such period.

Referring to FIG. 1, the received modulation is applied to input 21 of a clipper and time-differentiating circuit which delivers at its output 131 a positive control pulse *It* for every positive or negative transition of the modulation. If it is assumed for the time being that there is a direct connection between the points 31 and 35 in FIG. 1 and that the connections 132 and 133 are interrupted, element 6 of FIG. 1 being not used, in which event the elements 2–5 together form a prior art synchronized clock receiving the pulses *It* from the clipper and time-differentiating circuit 1 at its input 102 and outputting synchronized pulses I*e* at output 25.

The clock comprises:

A crystal oscillator 2 outputting pulses I*u* whose repetition rate $f$ is an integral multiple $k$F of the rated modulation speed F of the received modulation, the factor $k$ being chosen in this case to be of the form $2^{n11}$;

A binary counter 4 comprising $n$ stages and having one input and several outputs, only the outputs of the stages or rank $(n-1)$ and $n$ (with the references 120 and 121) being shown;

A sync circuit 3 having three inputs and one output and receiving the pulses I*u* from generator 2 at the first input 101, the pulses I*t* from circuit 1 at a second input 102, and the signal appearing at 121 at a third input 103, the output 104 of circuit 3 being connected to the input of counter 4, and A time-differentiating circuit 5 whose input is connected by connection 123 to counter output 121 and which delivers at its output 25 a sync pulse at each return of counter 4 to zero.

The synchronizer 3 is a coincidence circuit comprising, as can be seen in FIG. 2:

A differentiating circuit 10 connected by a polarity inverter 11 to input 103 of circuit 3 and delivering a positive reference pulse I*r* when output 121 of the stage of rank $n$ of counter 4 changes over from the U-state to the Z-state at the instant of time $T(2^{n11})$ of each cycle of the counter 4;

A time-differentiating circuit 12 which outputs a positive pulse I*z* when output 121 of the stage of rank $n$ of the counter 4 changes over from the Z-state to the U-state at the instant of time $T(2^n)$ of each cycle—i.e., at each return of counter 4 to zero;

A flip-flop 13 whose input A receives at terminal 102 the pulses I*t* from circuit 1 and whose input B receives via OR-gate 14 the pulses I*r* or the pulses I*a* output by the circuits 10 and 12 respectively;

An AND-gate 15 whose first input is connected to output Q of flip-flop 13 and whose second input receives the pulses I*r* output by the differentiating circuit 10, the gate 15 being conductive for a pulse I*r* if a pulse occurring in the first half of the clock cycle concerned has changed over the output Q from the Z-state to the U-state;

An AND-gate 16 having a first input connected to the output $\overline{Q}$ of flip-flop 13 while its second input receives the pulses I*z* output by the differentiating circuit 12, gate 16 being conductive for a pulse I*z* if no pulse I*t* has appeared during the second half of the clock cycle concerned, the output $\overline{Q}$ therefore having remained in the U-state, and An OR-gate 17 whose three inputs are connected to the output of oscillator 2 and to the outputs of gates 15 and 16 respectively, said OR-gate 17 delivering, via output 104 of sync circuit 3, the pulses I*u*, I*r* or I*z* from the elements 1, 10 and 12 respectively to the input of counter 4.

When the pulse I*t* belonging to a cycle of rank N appears, flip-flop 13 changes over into the operative state and its output Q changes over from the Z-state to the U-state; any pulse I*r*(N) appearing at the instant of time T(0) of the cycle N is applied simultaneously to gate 15 and to input B of flip-flop 13, which returns to its normal state but with sufficient delay after the time of appearance of the pulse I*r*(N) for the same to be transmitted through gates 15 and 17 to the input of counter 4, so that the latter pulse steps counter 4 on by one unit and steps the clock on by a time interval $1/f$.

At the end of the cycle of rank N the flip-flop 13 is in its normal state, its output $\overline{Q}$ is in the U-state and the pulse I*z*(N) appearing at the time T(16) of this cycle goes through the gates 16 and 17 to the input of counter 4 to step the clock on by a further 1/*f*, so that the duration of the cycle N is reduced to $(2^n-2)/f$—i.e., to 14/*f* if *n*=4.

In the cycle of rank (N+1), when the pulse I*r*(N+1) appears at the time T(8) of the cycle, the flip-flop 13 is in its rest state and the latter pulse is blocked by the gate 15; when the pulse I*t*(N+1a') appears the flip-flop 3 changes over to its operative state and its output $\overline{Q}$ changes over from the U-state to the Z-state, so that the pulse Iz(N+1), when it appears at the time T(16), is blocked by the gate 16, so that the length of the cycle of rank (N+1) becomes $2^n/f$—i.e., (*k*+1)/*f* (or 16/*f* in the present case).

Consequently, the two consecutive phase corrections produced by the pulses I*t*(N) and I*t*(N+1) cancel one another out, the phase difference between the clock and the received modulation remaining unchanged. When these events recur, the synchronizing operation may be appreciably delayed and in some cases fail to start. As described hereinafter, the invention improves on a prior art clock by enabling the synchronizing operation to start in some of the disadvantageous cases hereinbefore mentioned.

It will now be shown how introducing suitable electronic gate means 6 between the connections 131 and 135 of FIG. 1 helps to obviate the disadvantage just described. The function of the means 6 is to permit or bar transmission of the impulses I*t* from generator 2 to sync circuit 3, depending on which clock cycle portion such pulses appear in. Still referring to FIG. 1, the electronic gate means 6 according to the invention can be seen therein interposed between the output connection 131 of circuit 1 (which delivers the control pulses I*t*) and the connection 135 to input 102 of circuit 3.

The means 6, which will be described hereinafter with reference to FIG. 3, can also be used in combination with any other clock using the digital synchronization method hereinbefore defined, for instance, with the clock pulse generators described in the literature mentioned previously. The means 6 comprises an AND-gate 20 and a coincidence circuit comprising all the other elements of the facility 6 and controlling gate operation and comprising three inputs 31–33 and one output 34. The gate 20 comprises a first input, receiving via input 31 the control pulses I*t* from circuit 1, a second input connected to output 34 of OR-circuit 306, and an output 35 connected to input 102 of circuit 3, gate 20 conducting or blocking the pulses I*t* from circuit 1 according as the signal appearing at output 34 is in the U-state or in the Z-state. The pulses I*t* are applied to input 31 of means 6, the two inputs 32, 33 of the circuit are connected to outputs 120, 121 respectively of counter 4—i.e., to those outputs of the last two stages of counter 4 which are in the U-state when such stages are at rest.

The gate means 6 also comprise:

An AND-gate 301 whose first input receives the signals appearing at output 120 of counter 4 and whose second input receives the signals appearing at output 121 of counter 4, the output of gate 301 being in the U-state when such stages are both in the normal state, the output of gate 301 being in the Z-state when at least one of such stages is in the operative state;

An AND-gate 302 which passes the pulses I*t* reaching its first input when its second input connected to the output of gate 301 is in the U-state—i.e., when the last two stages of counter 4 are both in the rest position (first quarter of the cycles of counter 4);

An AND-gate 303 which passes the pulses I*t* reaching its first input when its second input connected via polarity inverter 304 to the output of gate 301 is in the U-state—i.e., when at least one of the last two stages of counter 4 is in the operative position (second, third and fourth quarters of the cycles of counter 4);

A flip-flop 305 which changes over from its rest state to its operative state when a pulse I*t* gated by gate 302 is applied to its input A, its output $\overline{Q}$ then changing over from the U-state to the Z-state, flip-flop 305 returning to its rest state when a pulse I*t* by gate 303 is applied to its input B, its output Q then changing over from the Z-state to the U-state, and A 3-input OR-gate 306 whose inputs receive the signals appearing at counter outputs 120 and 121 and at the output of 305, respectively, and whose output 34 is connected to that input of AND-gate 20 which is not connected to 31, output 34 being in the U-state when at least one of the terminals 32 and 33 or the output 305 is in the rest state.

Figure 4:
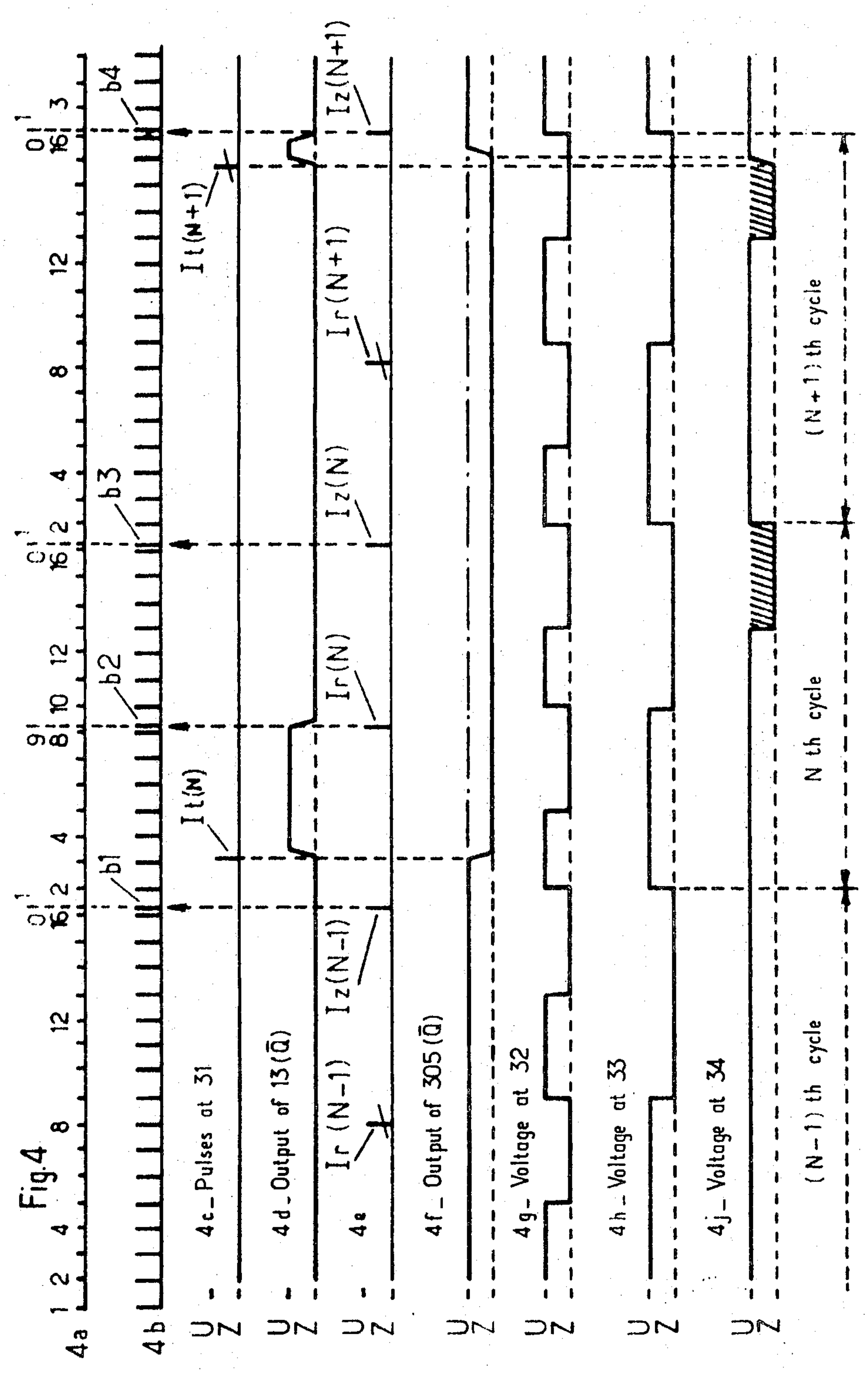

FIG. 4 consists of a number of graphs showing how the gate means 6 operates in the case in which a first impulse I*t*(N) has occurred during the first quarter of a clock cycle (cycle of rank N), but the next pulse I*t*(N+1) occurs in the last quarter of a later clock cycle—in this case, the cycle of rank (N+1). It has also been assumed that no transition appeared during the cycle of rank (N−1) and that the factor *k* equals 15.

The graphs 4*a* to 4*j* respectively show, plotted against time:

4*a*—the stepping state of counter 4;

4*b*—the pulses I*u* output by oscillator 2;

4*c*—the pulses I*t*(N) and I*t*(*N*+1) previously mentioned;

4*d*—the signal appearing at output $\overline{Q}$ of flip-flop 13 of sync circuit 3 (see FIG. 2);

4*e*—the pulses I*r* and Iz appearing during the cycles of rank (N−1), N and (N+1), those of such pulses which are gated to counter 4 being shown on graph 4*b* in positions *b*1, *b*2, *b*3 and *b*4, while those of such pulses which are blocked by circuit 3 operating in combination with facility 6 are crossed with a sloping line;

4*f*—signal appearing at output $\overline{Q}$ of flip-flop 305;

4*g*—the signal appearing at output terminal 120 of counter 4;

4*h*—the signal appearing at output terminal 121 of counter 4, and

4*i*—the signal appearing at output 34 of OR-circuit 306; the time intervals during which the pulses I*t* are blocked by the facility are shown hatched in this graph.

The length of the cycles of ranks (N-1), (N) and (N+1), expressed as a function of *k* and 1/*f*, is given at the bottom of the drawing.

As the drawing (graphs 4*g* and 4*h*) shows, for the first three quarters of every cycle at least one of the last two stages of *c* counter 4 is in its normal state, and output 34 of gate 306 (graph 4*j*) is then in the U-state, so that gate 20 passes all the pulses I*t* appearing during the first three-quarters of every clock cycle. the I*t*(N), upon it arrival (in the first quarter of cycle N), goes through gate 20 to input 102 of circuit 3 which outputs via 104 to the input of counter 4 the pulse I*r*(N) appearing at the instant of time T(8), the latter pulse stepping the clock on by 1/*f* (graphs 4*e* and 4*b* ). During the first quarter of the cycle of rank N, the last two stages of counter 4 are both in their normal state and the output of gate 301 is in the U-state; consequently, gate 302 gates the pulse I*t*(N) to input A of flip-flop 305, which changes over to its operative state, its output changing over from the U-state to the Z-state (graph 4*f*). During the end of the cycle of rank N and the start the cycle rank (N+1), the output of flip-flop 305 remains in the Z-state until the arrival of pulse I*t*(N1), so that at the start of the fourth quarter of the cycle of rank (N+1), since the outputs of flip-flop 305 and the terminals 120, 121 (graphs 4*f*, and 4*g*, 4*h*) are all in the Z-state, gate 20 blocks the pulses I*t*.

When the pulse I*t*(N+1) appears, it is blocked by gate 20, but gate 303 is conductive and gates such pulse to input B of flip-flop 305, which returns to its normal state. The output of flip-flop 305 changes over from the Z-state to the U-state, the output 34 (graph 4*j*) changes over to the U-state, and gate 20 again becomes conductive for the pulses I*t*, but with sufficient delay from the time of appearance of pulse I*t*(N+1) to ensure that the same is blocked by gate 20 and cannot act to delay the clock by 1/*f*. The phase correction produced by pulse I*t*(N) cannot therefore be cancelled by the action of the pulse I*t*(N+1) as would occur if the facility 6 was not used. The synchronizing operation can therefore start.

Should a pulse I*t*(N+1) appear in the last quarter of a clock cycle without the previous pulse I*t*(N) having appeared in the first quarter of an earlier cycle, the flip-flop 305 remains in its normal state and its output remains in the U-state (chaindotted line of graph 4*f*), so that gate 20 gates the pulse I*t*(N+1) although both of the counter terminals 120, 121 are in the Z-state.

The improvement provided by the invention used in combination with a clock of any of the kinds mentioned previously will become apparent from the following description of the unfavorable case of a modulation only affected with asymmetrical distortion when a first transition occurs in the first quarter of a clock cycle.

It will be assumed that such transition occurs at a time separated from the instant T(0) of the cycle by a time interval $m/f$, $m$ being between 0 and $2^{n/2}$. If the asymmetrical distortion level $d$ of the modulation expressed as a percentage is between the limits defined by the double inequality:

$$100(1+m)/k<d<[100(1+m)/k]+25 \quad (1)$$

the next transition is bound to appear either in the last quarter of the same cycle or in some subsequent cycle. From formula (1), and depending on the values of $m$ and $k$, it is possible to work out the asymmetrical distortion limits between which the facility according to the invention operates to start the synchronizing operation. As a first example, assuming that $k$ equals $(2^5-1)$—i.e., 31, and $m$ is of the order of a few units, for instance, 2, the arrangement according to the invention enables synchronism to be achieved with asymmetrical distortion levels of approximately from 10 to 35 percent. In the absence of the arrangement according to the invention, distortion levels greater than about 10 percent would prevent synchronization.

As a second example, the very disadvantageous case will be mentioned in which $m$ differs very little from 0—i.e., $m$ is small relatively to unity. Formula (1) then becomes:

$$100/k<d<[100/k]+X25$$

Assuming $k$ equal to 31 as in the first example, the arrangement according to the invention ensures synchronization at asymmetrical distortion levels between a bottom limit and a top limit equal to 3.3 and 28.2 percent respectively, whereas synchronization without the arrangement according to the invention is impossible.

When the level $d$ is substantially equal to either of these limits, the operation of the device according to the invention can be explained as follows:

In the case of the bottom limit of 3.3 percent the device according to the invention acts once; the transition of rank 2 appearing in the final quarter of a clock cycle cannot act to produce a phase correction which is the opposite of the phase correction previously by the transition of rank 1; the transition of rank 4 appears shortly after an instant of time T(0), and so do all the subsequent even and odd transitions; synchronization between the modulation and the clock is achieved after the occurrence of 16 transitions;

In the case of the top limit of 28.8 percent, the device according to the invention acts 16 times; the transitions of even rank 2, 4... 16... are not used and synchronization is achieved after the occurrence of transitions. These examples show that the arrangement according to the invention provides an approximately 25 percent increase in the range of asymmetrical distortion levels at which synchronization between the clock and the received modulation can be achieved.

What is claimed is:

1. A clock synchronization device for the reception of isochronous binary modulated signals, comprising:

means for deriving a brief control pulse from each modulation transition in said signals;

a local generator of periodic pulses having a repetition rate equal to an integral multiple of the rated modulation speed of said signals;

a synchronizer circuit receiving said periodic pulses at one input and at least part of said control pulses at a second input and delivering via an output stepping-on pulses to the input of a binary counter, said synchronizer circuit having a third input connected to an output of the final stage of said counter; and means connecting the last-mentioned output to a load terminal;

said device further comprising an electronic gate device (6) receiving the control pulses at a first input (31) and having an output (35) connected to the first input (102) of said synchronizer circuit (3), said gate device (6) having a second input (32) and a third input (33), respectively connected to an output (121) of the final stage of said counter (4) and to an output (120) of the penultimate stage of same said counter (4), a logic circuit being provided which makes said gate device (6) conductive or nonconductive between its first input (31) and its output (35) in dependence upon the momentaneaous binary state of the signals received at the outputs (120,121) of said penultimate and final stages of said counter (4) and in dependence upon the binary state of a flip-flop (305) controlled by said control pulses together with latter said signals.

2. A synchronization device as claimed in claim 1, in which said gate device (6) comprises an AND-gate (20) whose output (35) is connected to said second input (102) of said synchronizer circuit (3), a first input connected to a terminal (31) receiving said control pulses, and a second input connected to the output (34) of an OR-circuit (306) having three inputs; and two inputs (32, 33) of such three inputs are connected to the outputs (120, 121) respectively of the stages of the counter (4), the third input of OR-circuit (306) being connected to an output of said flip-flop (305) whose state is controlled by the control pulses applied to said first input (31) together with the signal applied to said second and third inputs (32, 33) of said OR-circuit (306).

3. A synchronization device as claimed in claim 2, in which there are provided means for controlling said flip-flop (305) which comprise three AND-gates (301, 302, 303), the first of which (301) having its two inputs connected to said inputs (32, 33) respectively, while the other two (302, 303) of which each have one input connected to said terminal (31) and their other inputs connected to the output of said gate (301) directly for one (302) of latter said two gates and via a polarity inverter (304) for the other (303) of latter said two gates; and in which the outputs of the gates (302, 303) are respectively connected to two control inputs (A, B) of said flip-flop (305).

4. A synchronization device as claimed in claim 1, in which said control pulses are derived from each modulation transition through a clipper and time-differentiating circuit (1) whose input (21) receives said isochronous binary modulated signals and whose output is connected to said first input (31) of said gate device (6).

5. A synchronization device as claimed in claim 1, in which said output (121) of said last stage of said counter (4) is connected to said load terminal (25) through a time-differentiating circuit (5).